UNITED STATES PATENT OFFICE.

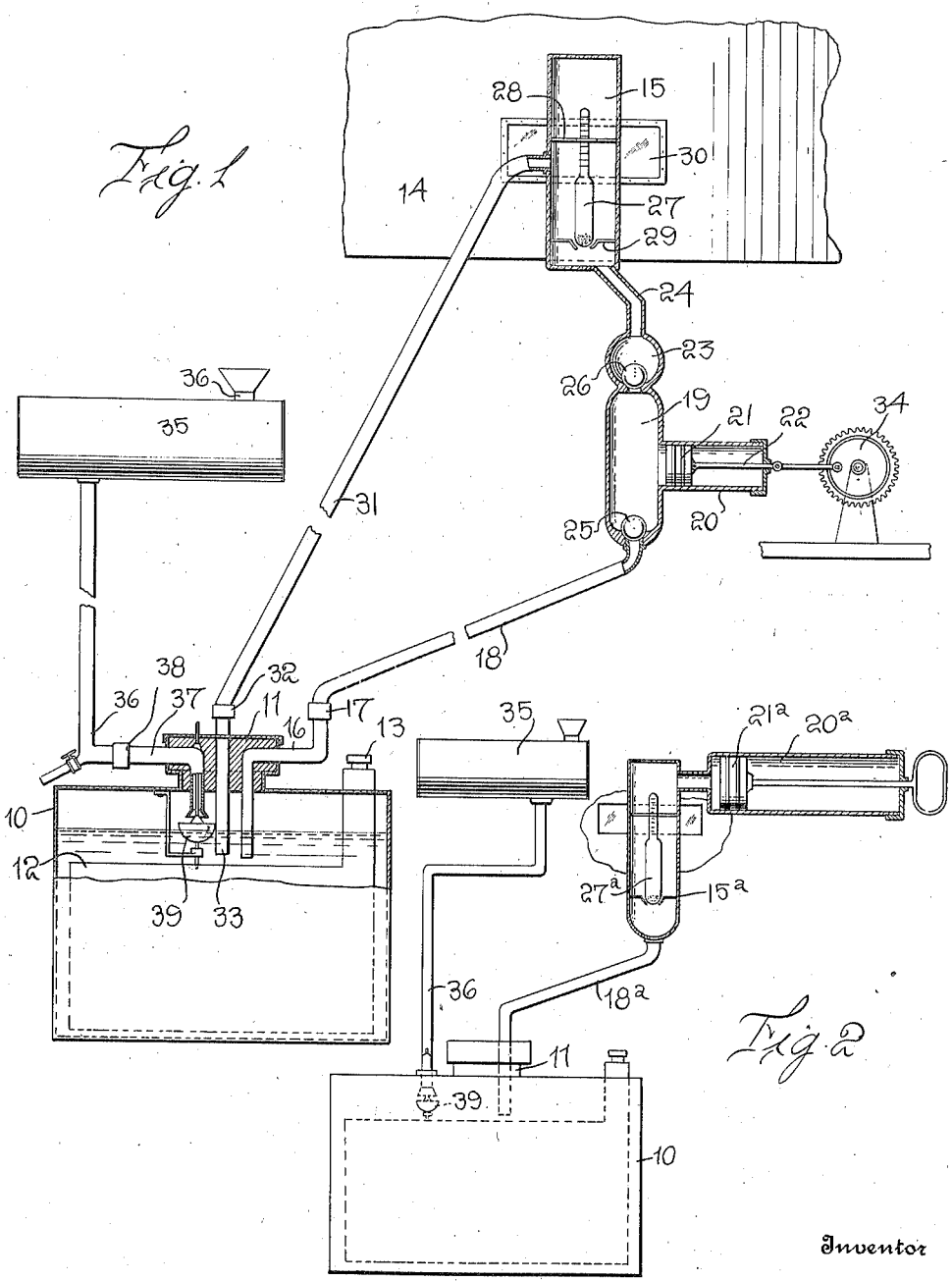

ERNEST CAMP, OF SAN DIEGO, CALIFORNIA.

SIGHT STORAGE-BATTERY TESTER.

1,308,223.   Specification of Letters Patent.   Patented July 1, 1919.

Application filed July 2, 1917. Serial No. 178,227.

*To all whom it may concern:*

Be it known that I, ERNEST CAMP, a citizen of the United States, residing at San Diego, in the county of San Diego and State of California, have invented certain new and useful Improvements in Sight Storage-Battery Testers, of which the following is a specification, reference being had to the accompanying drawings.

This invention relates to means for determining the condition of storage batteries, and particularly to means for determining the condition of storage batteries used in automobiles.

Storage batteries in use in automobiles today are placed in such positions that in order to investigate the condition of the storage battery, it is necessary to lift seats, remove foot boards, and otherwise do a considerable amount of work in order to get at the storage battery.

The general object of my invention is to do away with this inconvenience and provide means for ascertaining at any time, without removing any part of the car, the exact condition of any cell of the storage battery, thus avoiding expensive repair bills, due to a running down of the battery and avoiding also being caught without sufficient battery power for lights, self starters, etc.

A further object in this connection is to provide a hydrometer chamber having a connection to the storage battery cell and provide means whereby the liquid electrolyte may be drawn or forced into the hydrometer chamber so that the electrolyte may be tested.

Another object in this connection is to provide means for maintaining a certain portion of electrolyte in this hydrometer chamber and at any time desired forcing this electrolyte so maintained within the chamber back into the storage battery cell or for maintaining a circulation of electrolyte from the cell through the hydrometer chamber and back again so that the condition of the battery at any time may be readily observed.

A further object is to provide means whereby the hydrometer or testing chamber may be disposed upon the dash board of the automobile in a position for easy observation and whereby the power of the engine may be used to cause the constant circulation of the electrolyte through the chamber.

Still another object is to provide means whereby distilled water may be supplied in small amounts from time to time to the cell, as circumstances require, and in this connection to provide means for refilling the cell with distilled water whenever the level of the liquid lowers below a certain point, thus compensating for evaporation and keeping the electrolyte at a level above the inlet end of the pipe leading to the hydrometer chamber.

Other objects will appear in the course of the following description.

My invention is illustrated in the accompanying drawings, wherein:—

Figure 1 is a diagrammatic view showing my improved means for testing a cell of a storage battery, certain of the parts being in section; and Fig. 2 is a like view to Fig. 1, but showing a modified form of testing mechanism.

Referring to these drawings, 10 designates the jar or cell of a storage battery of any usual or suitable construction, this cell being closed by a plug 11. This cell contains the usual grid 12 and is provided with the usual binding post 13. In all respects the storage battery cell is of any usual or suitable form.

Mounted upon the dash board 14 of the automobile, and preferably upon the forward face of the dash board, is a chamber 15 forming the testing chamber. This chamber is operatively connected at its lower end in a manner which will be later described with the storage battery cell. To this end, a duct 16 extends out through the plug 11. This duct may be in the form of a tube inserted through the plug and provided with a coupling 17. From the coupling 17 extends a length of pipe 18, this pipe opening at its end into a suction chamber 19, which is somewhat larger in diameter than the diameter of the pipe 18. From the suction chamber extends a pump cylinder 20 and operating within the cylinder is a piston 21 carried by a piston rod 22, which passes out through a suitable stuffing box or gland in the head of the cylinder.

The chamber 19 opens into a valve chamber 23 and this in turn connects by a tube 24 to the lower end of the hydrometer chamber 15. Disposed within the suction chamber 19 is a ball check valve 25, which is normally disposed on a seat at the lower end of the chamber 19 and prevents the back flow of liquid from this chamber 19. Disposed within the valve chamber 23 is a ball check valve 26, which prevents the return flow of liquid from the chamber 23 into the chamber 19.

Disposed within the hydrometer chamber 15 is a hydrometer 27 of any suitable or usual form. The stem of this hydrometer is slidably mounted in a guide 28 attached to the wall of the chamber 15 and the lower end of the hydrometer normally rests upon a support 29. The dash board 14 is provided with a sight opening 30, whereby the numerals on the stem of the hydrometer may be observed. In Fig. 1 a return pipe 31 extends from the middle portion of the chamber 15 back to a coupling 32, the pipe 31 being connected by this coupling to a short section of pipe 33 which extends into and through the plug 11.

I have illustrated the piston rod 22 as being reciprocated by means of a crank disk 34. This crank disk 34 may be in the form of a gear wheel, as illustrated, operatively connected to a suitable driving shaft driven by the engine, or it may be driven by clockwork or turned by hand. The cylinder 20 and the piston 21 with the valves 25 and 26 act as a pump and as the piston is reciprocated, the liquid will be drawn up from the battery through the pipe 18, discharged into the chamber 19 and discharged into the chamber 15. As the liquid fills the chamber 15, the hydrometer will rise in the usual manner and the figures on the stem seen through the sight opening 30 will indicate the condition of the electrolyte. When surplus liquid is pumped into the chamber 15, it will return to the cell through the pipe 31 and its connections, so that there will be no loss of battery liquid.

In storage batteries, the liquid in the cell lowers by evaporation and in order to provide for an automatic feed of distilled water to the cell to compensate for this loss by evaporation, I provide a water tank 35 having a filling opening 36, normally closed by a cap or plug, this tank 35 discharging by means of a pipe 36 into the cell, the pipe 35 being connected to a relatively short section of pipe 37 extending out through the plug 11 by means of a coupling 38. The pipe 37 has one leg, which extends downward into the liquid in the cell and downward passage through this pipe 36 is controlled by a float valve 39. As water lowers in the cell by evaporation or for any other reason, this float check valve 39 lowers from its seat against the lower end of the pipe 37 and allows water to flow from the tank 35 to the storage cell. Float valve 39 only allows a very small quantity of liquid to flow from the tank 35 into the cell per minute, as for instance, in actual practice, only 20 drops of distilled water will flow from the tank 35 into the cell per minute. It is to be noted that the discharge opening of the pipe 37 is disposed substantially at the middle of the longitudinal axis of the cell 10, so that variations in the liquid of the cell due to an automobile tipping up in one direction or the other will not cause much, if any, movement of the valve 39. When the liquid rises beyond a predetermined level, the check valve 39 being buoyant rises and closes the pipe 37 preventing water from discharging into the cell.

In Fig. 2, I show another form of my invention, which operates on the same principle, and in this figure, 10 designates the cell and 11 a plug, as before described. The testing or hydrometer chamber is designated 15$^a$ and leading from the cell to the lower end of the hydrometer chamber is the pipe 18$^a$. Disposed within the hydrometer chamber is the hydrometer 27$^a$ of the kind heretofore described and leading from the upper end of the chamber 15$^a$ is a pump cylinder 20$^a$ having therein a piston 21$^a$, the piston having a piston rod provided with a handle whereby the piston may be manually operated.

It will be noted that there is no return pipe from the hydrometer chamber 15$^a$ into the storage battery and that the pump is operated by hand. Nor is it intended that the piston of the pump shall be reciprocated a plurality of times in order to draw a suitable amount of liquid from the storage battery, but the capacity of the cylinder 20$^a$ is sufficient that upon an outward movement of the piston, enough liquid will be drawn into the cylinder 20$^a$ and into the chamber 15$^a$ as will float the hydrometer 27$^a$. After the condition of the cell has been tested, the piston 21$^a$ is forced inward, thus forcing all the liquid back into the tank. The cell illustrated in Fig. 2 is also adapted to be connected to a water tank 35, in the manner heretofore described.

It is to be understood that the drawings are intended to illustrate a system whereby I provide means for testing at any time the condition of the battery and that these drawings are largely diagrammatic in their nature, as the exact position of the various parts and the details of construction will vary with different makes of cars and different circumstances. It will be seen that my invention provides means whereby the condition of the storage battery on a motor car may be readily tested at any time, without the necessity of removing any parts from the car and without any inconvenience. As before remarked, the pump might be constantly reciprocated and thus cause a steady flow of electrolyte through the testing chamber 15 or the piston may be reciprocated only when it is desired to make a test of the electrolyte and then only sufficiently to fill the testing chamber 15 as in the system illustrated in Fig. 2.

It will also be seen that I have provided very simple means for automatically keeping the battery liquid at the proper level and this is particularly essential, as if the battery liquid gets too low, the battery will be ruined.

As before stated, the object of this invention is to determine the exact condition of a storage battery cell at any instant, without going to the trouble of tearing a car all to pieces in order to get at the battery. In order that this test may be made under proper conditions, it is necessary that the cell shall contain at all times a proper amount of water. Should the liquid in the cell be lower than the pipe 16, nothing could be drawn into the hydrometer chamber but air, and thus the cell could be over or under charge, without any showing being made on the tester and it will be necessary, in order to test the battery, to remove whatever parts of the car cover the battery, remove the plugs of the battery, take a hydrometer rating, and replace all parts, or it would be necessary to refill the battery with distilled water and to run the car four or five days before a reading could be made, inasmuch as the water would not mix with the battery solution before that length of time.

It is, therefore, absolutely necessary that a tank for distilled water be provided which will discharge distilled water into the cell when the liquid in the cell lowers, so that at no time shall the liquid level in the cell fall below the extremity of the pipe 16 or the pipe 18ᵃ in Fig. 2. When any amount of water is placed in the cell at one time, it is impossible to take a rating until the water mixes and it is for this reason, among others, that I provide the check valve carried by the float 39, this check valve only allowing water to flow from the valve 29 at a rate of 20 drops per minute. Furthermore, by dropping the water at this rate into the electrolyte, I have found that the condition of the liquid is not materially changed and the water becomes thoroughly mixed with the electrolyte. It is requisite that the outlet end of the pipe leading from the tank 35 should be disposed as near the middle of the cell as possible, as should the filling pipe be placed toward the front end of the cell, then when the car was going up hill, the liquid in the cell would run to the lower end of the cell, allowing the battery to flood, wasting the liquid and also the overflowing acid would damage the metallic parts of the car.

It is to be understood that there is to be a separate tester for each cell of the battery as the electrolyte in no two cells is ever the same.

Having described my invention, what I claim is:—

1. In an automobile having a dashboard and a storage battery, means for testing the electrolyte therein including a transparent testing chamber mounted upon the dashboard and having a tubular connection to the battery cell, a hydrometer within the testing chamber, a pump operatively connected to the testing chamber to cause liquid from the cell to flow into the testing chamber, and means for returning liquid to the cell.

2. The combination with a storage battery cell, of means for testing the electrolyte therein comprising a testing chamber, a suction chamber having an inlet connected to the cell and an outlet connected to the testing chamber, check valves preventing back flow from the suction chamber and from the testing chamber, a pump cylinder connected to the suction chamber, and a reciprocable piston operating within the cylinder.

3. The combination with a storage battery cell, of means for testing the electrolyte therein comprising a testing chamber, a suction chamber having an inlet connected to the cell and an outlet connected to the testing chamber, check valves preventing back flow from the suction chamber and from the testing chamber, a pump cylinder connected to the suction chamber, a reciprocable piston operating within the cylinder, and a return flow pipe from the testing chamber to the cell.

4. In an automobile having a storage battery and a dash board, a testing chamber mounted upon the dash board, a hydrometer therein, a tubular connection leading from the testing chamber into a cell of the battery, a pump operatively connected to the tubular connection and acting to pump electrolyte from the cell into the testing chamber, and a return pipe leading from the testing chamber back into the cell.

In testimony whereof I hereunto affix my signature in the presence of two witnesses.

ERNEST CAMP.

Witnesses:
S. B. CAMP,
F. J. KELLY.